US008103547B2

(12) United States Patent
Mah et al.

(10) Patent No.: US 8,103,547 B2
(45) Date of Patent: Jan. 24, 2012

(54) LOGOCONS: AD PRODUCT FOR BRAND ADVERTISERS

(75) Inventors: Teresa B. Mah, Bellevue, WA (US); Brian Burdick, Bellevue, WA (US); Li Li, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1179 days.

(21) Appl. No.: 11/532,680

(22) Filed: Sep. 18, 2006

(65) Prior Publication Data

US 2008/0071612 A1  Mar. 20, 2008

(51) Int. Cl.
G06Q 30/00 (2012.01)
(52) U.S. Cl. .................. 705/14.73; 705/14.49
(58) Field of Classification Search .............. 705/14, 705/10, 14.73
See application file for complete search history.

(56) References Cited

U.S. PATENT DOCUMENTS

| | | | |
|---|---|---|---|
| 5,471,925 A * | 12/1995 | Heinrich et al. | 101/91 |
| 6,112,186 A | 8/2000 | Bergh | |
| 6,161,137 A * | 12/2000 | Ogdon et al. | 709/224 |
| 6,182,090 B1 * | 1/2001 | Peairs | 715/209 |
| 6,360,221 B1 * | 3/2002 | Gough et al. | 707/10 |
| 6,441,836 B1 * | 8/2002 | Takasu et al. | 715/835 |
| 6,633,850 B1 * | 10/2003 | Gabbard et al. | 705/14 |
| 6,778,975 B1 * | 8/2004 | Anick et al. | 707/1 |
| 6,850,653 B2 * | 2/2005 | Abe | 382/312 |
| 6,915,271 B1 * | 7/2005 | Meyer et al. | 705/14.35 |
| 6,920,606 B1 * | 7/2005 | Jablonski et al. | 715/202 |
| 7,035,863 B2 | 4/2006 | Kurapati | |
| 7,065,550 B2 | 6/2006 | Raghunandan | |
| 7,107,618 B1 * | 9/2006 | Gordon et al. | 726/24 |
| 7,120,235 B2 * | 10/2006 | Altberg et al. | 379/114.13 |
| 7,143,177 B1 * | 11/2006 | Johnson et al. | 709/231 |
| 7,281,928 B1 * | 10/2007 | Freeman | 434/156 |
| 7,308,420 B1 * | 12/2007 | Storch et al. | 705/14.15 |
| 7,406,508 B1 * | 7/2008 | Herrmann et al. | 709/217 |
| 7,424,543 B2 * | 9/2008 | Rice, III | 709/229 |
| 7,433,857 B2 | 10/2008 | Rice et al. | |

(Continued)

FOREIGN PATENT DOCUMENTS

KR 1020000030051 * 5/2000

(Continued)

OTHER PUBLICATIONS

"Advertainment or Adcreep? Game Players' Attitudes towardAdvertising and Product Placements in Computer Games"; Nelson, Michelle R., Keum, Heejo2, and Yaros, Ronald A.; Journal of Interactive Advertising; Autumn2004, vol. 4 Issue 3.*

(Continued)

Primary Examiner — John Weiss
Assistant Examiner — Adam Chornesky
(74) Attorney, Agent, or Firm — Shook Hardy & Bacon LLP

(57) ABSTRACT

Logocons provide a new online advertising product for brand advertisers. During a computing session especially with consumer-generated content, brand names may be replaced or supplemented with logocons in web pages, files, documents, or other online writings as a form of branding. Written information in the computing session is sent to a parsing or searching engine that searches for particular text corresponding to the brand name. The text is replaced or supplemented with a logocon. A user then views the enhanced information containing the logocon but has the option of prohibiting the logocon from appearing in the information.

12 Claims, 6 Drawing Sheets

U.S. PATENT DOCUMENTS

| | | | |
|---|---|---|---|
| 7,496,560 B2* | 2/2009 | Manber et al. | 707/3 |
| 7,529,835 B1* | 5/2009 | Agronow et al. | 709/226 |
| 7,599,856 B2* | 10/2009 | Agrawal et al. | 705/26 |
| 7,627,542 B2* | 12/2009 | Tantrum et al. | 706/20 |
| 2001/0034646 A1* | 10/2001 | Hoyt et al. | 705/14 |
| 2001/0037205 A1* | 11/2001 | Joao | 705/1 |
| 2002/0007370 A1* | 1/2002 | Brown | 707/501.1 |
| 2002/0120505 A1* | 8/2002 | Henkin et al. | 705/14 |
| 2003/0040957 A1* | 2/2003 | Rodriguez et al. | 705/14 |
| 2003/0101024 A1 | 5/2003 | Adar | |
| 2003/0115602 A1* | 6/2003 | Knee et al. | 725/42 |
| 2003/0135824 A1* | 7/2003 | Ullmann et al. | 715/513 |
| 2003/0154237 A1* | 8/2003 | Mah et al. | 709/201 |
| 2004/0111465 A1* | 6/2004 | Chuang et al. | 709/203 |
| 2004/0169688 A1* | 9/2004 | Burdick et al. | 345/854 |
| 2004/0210479 A1* | 10/2004 | Perkowski et al. | 705/14 |
| 2004/0249809 A1 | 12/2004 | Ramani et al. | |
| 2005/0075932 A1* | 4/2005 | Mankoff | 705/14 |
| 2005/0091300 A1* | 4/2005 | Starbuck et al. | 709/200 |
| 2005/0149388 A1* | 7/2005 | Scholl | 705/14 |
| 2005/0149390 A1* | 7/2005 | Scholl et al. | 705/14 |
| 2005/0192992 A1* | 9/2005 | Reed et al. | 707/101 |
| 2005/0235030 A1* | 10/2005 | Lauckhart et al. | 709/200 |
| 2005/0278443 A1 | 12/2005 | Winner | |
| 2006/0004789 A1 | 1/2006 | Lunt | |
| 2006/0015588 A1 | 1/2006 | Achlioptas et al. | |
| 2006/0015904 A1* | 1/2006 | Marcus | 725/46 |
| 2006/0020538 A1* | 1/2006 | Ram et al. | 705/37 |
| 2006/0031118 A1* | 2/2006 | Morris | 705/14 |
| 2006/0041627 A1* | 2/2006 | Tu | 709/206 |
| 2006/0064431 A1 | 3/2006 | Kishore | |
| 2006/0085373 A1 | 4/2006 | Dhillion | |
| 2006/0085419 A1 | 4/2006 | Rosen | |
| 2006/0112082 A1 | 5/2006 | Platte et al. | |
| 2006/0121990 A1 | 6/2006 | O'Kelley, II | |
| 2006/0143081 A1 | 6/2006 | Argaiz | |
| 2006/0200381 A1* | 9/2006 | Elkholy et al. | 705/14 |
| 2006/0206380 A1* | 9/2006 | Joo | 705/14 |
| 2007/0015118 A1* | 1/2007 | Nickell et al. | 434/118 |
| 2007/0016613 A1* | 1/2007 | Foresti et al. | 707/104.1 |
| 2007/0043617 A1* | 2/2007 | Stein et al. | 705/14 |
| 2007/0112919 A1* | 5/2007 | Lyle et al. | 709/206 |
| 2007/0143176 A1* | 6/2007 | Nong et al. | 705/14 |
| 2007/0150498 A1 | 6/2007 | Li et al. | |
| 2007/0168354 A1 | 7/2007 | Ramer et al. | |
| 2007/0192106 A1 | 8/2007 | Zilca | |
| 2007/0192181 A1* | 8/2007 | Asdourian | 705/14 |
| 2007/0219940 A1* | 9/2007 | Mueller et al. | 707/1 |
| 2007/0239692 A1* | 10/2007 | McBride | 707/3 |
| 2008/0071612 A1* | 3/2008 | Mah et al. | 705/14 |
| 2008/0084025 A1* | 4/2008 | Oliphant | 273/153 R |
| 2008/0126411 A1* | 5/2008 | Zhuang et al. | 707/104.1 |
| 2008/0126523 A1* | 5/2008 | Tantrum et al. | 709/223 |
| 2008/0129758 A1* | 6/2008 | Fox et al. | 345/661 |
| 2008/0140491 A1* | 6/2008 | Jain et al. | 705/8 |
| 2008/0177994 A1* | 7/2008 | Mayer | 713/2 |
| 2008/0183587 A1* | 7/2008 | Joo et al. | 705/14 |
| 2008/0275899 A1 | 11/2008 | Baluja et al. | |
| 2009/0164475 A1 | 6/2009 | Pottenger | |
| 2009/0171918 A1* | 7/2009 | Manber et al. | 707/3 |
| 2009/0216799 A1 | 8/2009 | Manjrekar et al. | |

FOREIGN PATENT DOCUMENTS

| | | | |
|---|---|---|---|
| KR | 1020000063480 | * | 6/2000 |
| KR | 1020060073578 | * | 6/2006 |

OTHER PUBLICATIONS

"Challenges Met, Problems Solved: Logo Identification With Problem Solving"; Suzanne Bernadette; New Mexico Business Journal, May 2004; p. 69.*

Dialog quick searches performed by Examiner Oct. 18, 2011 (three of them); DialogSrchHistory; LogoEmailServerReplaceDialogOct. 18, 2011; FTInventorTxtSwap1DialogOct. 18, 2011.*

International Search Report dated Aug. 20, 2007.

Advisory Action mailed Jul. 27, 2009 in U.S. Appl. No. 11/534,616.

Final Office Action mailed Mar. 3, 2009 in U.S. Appl. No. 11/535,160.

Final Office Action mailed May 11, 2009 in U.S. Appl. No. 11/534,616.

Final Office Action mailed Jul. 9, 2009 in U.S. Appl. No. 11/352,494.

Notice of Allowance and Fee(s) Due mailed Sep. 17, 2009 in U.S. Appl. No. 11/534,616.

Office Action mailed Jul. 9, 2008 in U.S. Appl. No. 11/535,160.

Office Action mailed Oct. 28, 2008 in U.S. Appl. No. 11/352,494.

Office Action mailed Dec. 2, 2008 in U.S. Appl. No. 11/534,616.

Office Action mailed Nov. 2, 2009 in U.S. Appl. No. 11/352,494.

Baldwin, et al. "An Intelligent Method for Inferring Information about the User/Client," Informing Science 2001 Jun. 2001.

Ertoz, et al. "Finding Clusters of Different Sizes, Shapes, and Densities in Noisy, High Dimensional Data" Siam SDM03, pp. 47-58 Jan. 24, 2002.

Guha, et al. "CURE: An Efficient Clustering Algorithm for Large Databases," SIGMOD, 1998, pp. 73-84.

Karypis, et al, "Parallel Multilevel k-way Partioning Scheme for Irregular Graphs", IEEE, 1996.

Murray, et al., Abstract of "Inferring Demographic Attributes of Anonymous Internet Users," Lecture Notes in Computer Science, vol. 1836, Springer-Verlag, Berlin, Revised Papers from the Intl. Workshop on Web Usage Analysis and User Profiling on Aug. 15, 1999, pp. 7-20 (2000).

Tantrum, et al. Hierarchical Model-Based Clustering of Large Datasets Through Fractionation and Refractionation, SIGKDD'02, pp. 183-190.

Tzanavari, et al. "Intelligent Information Processing for User Modeling," 9 Intl. Conf. on Information Processing and Management of Uncertainty in Knowledge-Based Systems, Annecy, France, Jul. 2002, pp. 1763-1770.

Zhang, et al., "BIRCH: An Efficient Data Clustering Method for Very Large Databases," SIGMOD, 1996, pp. 103-114.

"McCallum, et al.,"'Efficient Clustering of High Dimensional Data Sets with Application to Reference Matching'"; KDD 2000, Boston, MA, 2000, pp. 169-178".

Newman, M. "Detecting community structure in networks," Eur. Phys. J. B 38, 2004, pp. 321-330.

* cited by examiner

LOGOCONS: AD PRODUCT FOR BRAND ADVERTISERS

CROSS-REFERENCE TO RELATED APPLICATIONS

Not applicable

STATEMENT REGARDING FEDERALLY SPONSORED RESEARCH OR DEVELOPMENT

Not applicable.

BACKGROUND

Advertising is very common in the computing environment. Primarily, the Internet includes many advertisers who use different mechanisms to advertise their products or services to the public. Because the number of advertisers continues to increase, advertisers continue to look for more creative ways to showcase their products or services.

In the computing environment, a user has a high probability of encountering an advertisement. The advertisement may take the form of an unsolicited email or may appear when a web page is accessed on the Internet. So, the chances are quite high that in a computing session, the user is likely to encounter a form of advertising. Because of the proliferation of advertisements, there is a tendency for the advertisement to go unnoticed by the user during the computing session. With this in mind, advertisers would like to find a creative way to get the user's attention for their advertisement without turning the user off from their computing activity and without invading the user's privacy.

Advertising may take various forms and advertisers have created various ways to promote their advertisements in the computing environment. For example, paid search advertising, contextual advertising, and display advertising are some of the types of advertising that may be encountered on the Internet.

Paid search advertising involves a keyword search and a search engine. When a user inputs a search term, the user may view the results containing a list of preferred web sites along with other web sites provided by the search engine. The preferred web sites usually relate to advertisers or publishers that have paid to have their web sites shown or placed in a prominent position when search results are returned to the user. In another context, some search engines may return the search results but list a set of advertisers off to the side of the web page with a set of links to web sites that are associated with the search term.

Contextual advertising involves showing the user that has accessed a web page advertising that is related to the web site or related to specific information in the web site. The idea here is to target specific advertising to the user based on what the user is viewing at the web site. Out of the view or without the knowledge of the user, computer software may scan information in the web page and provide advertisements based on the scanned text of the web page. This form of advertising may include providing a dynamic set of advertisements based on the web site provider's need or desire to provide as many types of advertisements in a limited-space environment in the web page.

Display advertising is another form of advertising that usually involves graphic information as opposed to textual information. The graphic information may include logos, photographs, and pictures to name a few. Display advertising may come in two forms, return on investment (ROI) advertising and brand advertising. Both types of advertising focus on branding, but brand advertising is especially important with advertisers as they try to develop ways to advertise to users in areas not associated with advertising. Brand advertising includes various ways to make users aware of products or services, and the advertiser's brand, to help increase sales of the products or services.

Brand advertisers contribute a large amount of revenue in the advertising business. However, it is difficult to target display brand advertising on some web sites because these web sites may host consumer-generated content (i.e. email, blog, community sites). The problem is that these web sites do not offer domain-specific content unlike some web sites that focus on a specific topic or area like MSN AUTOS and MSN MONEY websites provided by the Microsoft Corporation of Redmond, Wash.

Because advertisers are eager to provide as much information to the public, especially in the Internet, advertisers are willing to pay to provide their advertisements in web pages, emails, or any other computing environment. In many cases, advertisers pay on a cost per thousand (CPM) basis. This basis may include "how many clicks occur on an advertisement shown in a web page" or "how many times users visited a particular web site from a link on a web page." In any case, advertisers are looking for more creative ways to get their products or services to the user without the usual clicks on an advertisement or monitoring of traffic volume. Therefore, a solution is needed that would give advertisers a way to brand their products or services beyond the capabilities that exist today. The solution should include various forms of the computing environment such as the Internet, email, and computer applications. It should also include consumer-generated content.

SUMMARY

The Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The disclosure describes, among other things, a new form of display advertising in a computing environment. The various solutions are summarized below.

In a first aspect, information such as a document, email, blog, or instant message is received at a computing device. Computer software located on the computing device or elsewhere searches the information for pre-defined text. When the text is located in the information, either a logocon replaces the text or the logocon is placed next to the text in the information. The information is then provided to a display of the computing device or provided to another computing device the logocons embedded in the information. When a user encounters the information, the user may view the logocons in the information.

In another aspect, a logocon is displayed in a web page. A browser, web server, or a first computing device is configured to associate text with a logocon. A user accesses the web page at a second computing device. When the user views the web page, the computer software in either the browser, web server, or the first computing device operates to replace pre-defined text located in the web page with a logocon or operates to place a logocon next to the located pre-defined text in the web page. The user views the view web page with the embedded logocons.

BRIEF DESCRIPTION OF THE SEVERAL VIEWS OF THE DRAWINGS

The present invention is described in detail below with reference to the attached drawing figures, which are incorporated herein by reference, and wherein.

DETAILED DESCRIPTION

The present invention will be better understood from the detailed description provided below and from the accompanying drawings of various embodiments of the invention, which describe, for example, a media and system for providing logocons in a computing environment and for displaying logocons in a web page. The detailed description and drawings, however, should not be read to limit the invention to the specific embodiments. Rather, these specifics are provided for explanatory purposes that help the invention to be better understood.

Exemplary Operating Environment

Figure 1:
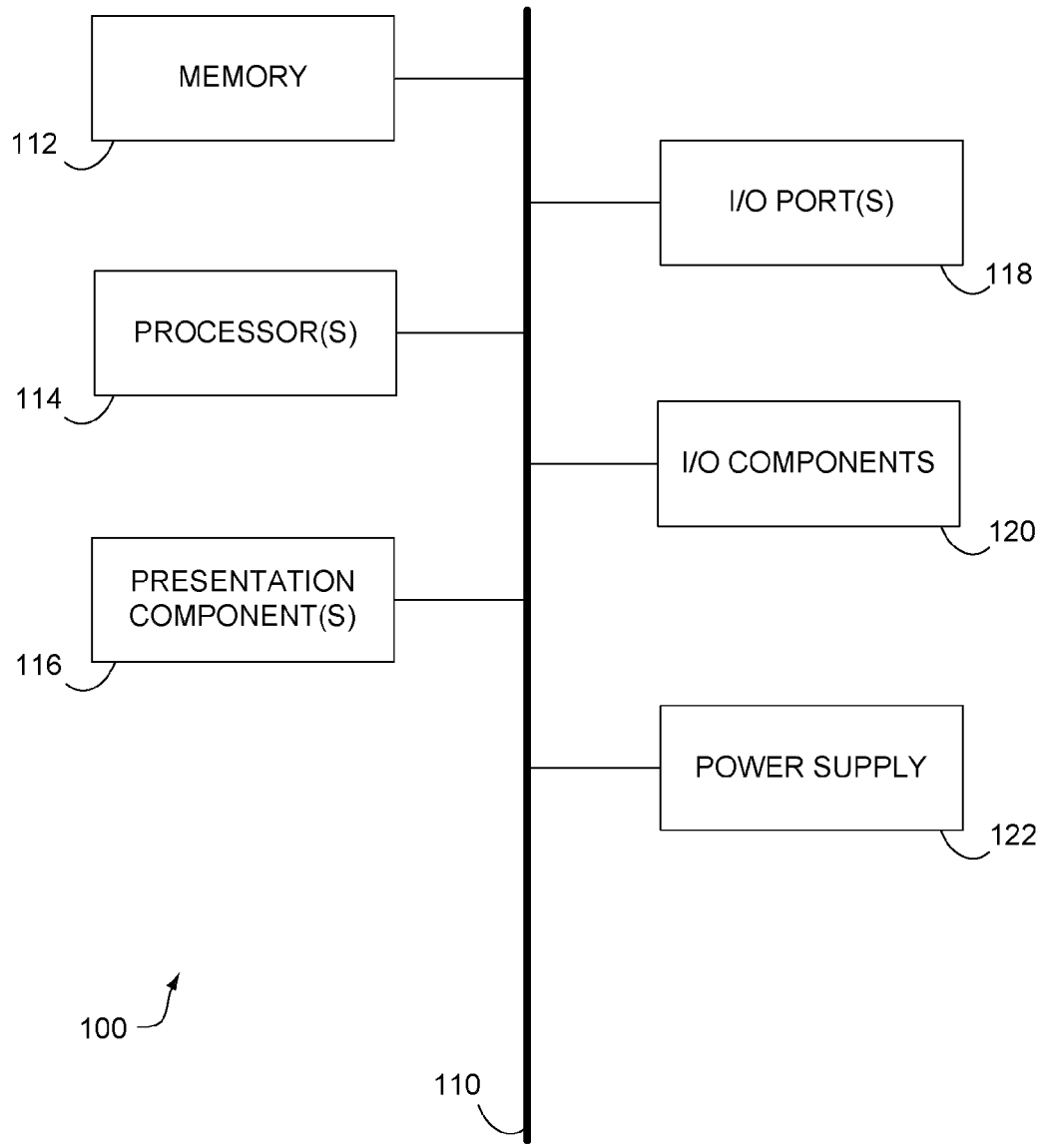
FIG. 1 is an exemplary operating environment suitable for practicing an embodiment of the present invention.

Referring to FIG. 1 in particular, an exemplary operating environment for implementing the present invention is shown and designated generally as computing device 100. Computing device 100 is but one example of a suitable computing environment and is not intended to suggest any limitation as to the scope of use or functionality of the invention. Neither should the computing-environment 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that performs particular tasks or implements particular abstract data types. The invention may be practiced in a variety of system configurations, including hand-held devices, consumer electronics, general-purpose computers, more specialty computing devices, etc.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative components include a microphone, joystick, game pad, satellite dish, scanner, printer, wireless device, etc.

Many different arrangements of the various components depicted, as well as components not shown, are possible without departing from the spirit and scope of the present invention. Embodiments of the present invention will be described with the intent to be illustrative rather than restrictive. Alternative embodiments will become apparent to those skilled in the art that do not depart from its scope. A skilled artisan may develop alternative means of implementing improvements without departing from the scope of the present invention.

To help explain the invention without obscuring its functionality, an embodiment will now be referenced. Although the present invention can be employed in connection with a computing-network environment, it should not be construed as limited to the exemplary applications provided here for illustrative purposes.

Logocons

A logocon is a logo icon that replaces or follows a brand or product name in text form with a brand or product logo. The logocon is an advertising product that can be used by brand advertisers to enhance brand recognition of their products or services. The idea is that the logocon may be embedded into consumer-generated content. The size of the logocon may vary according to the size of the remaining text that exists where the logocon is located. To further describe logocons and their use in brand advertising, several figures will be discussed below in detail.

Figure 2:
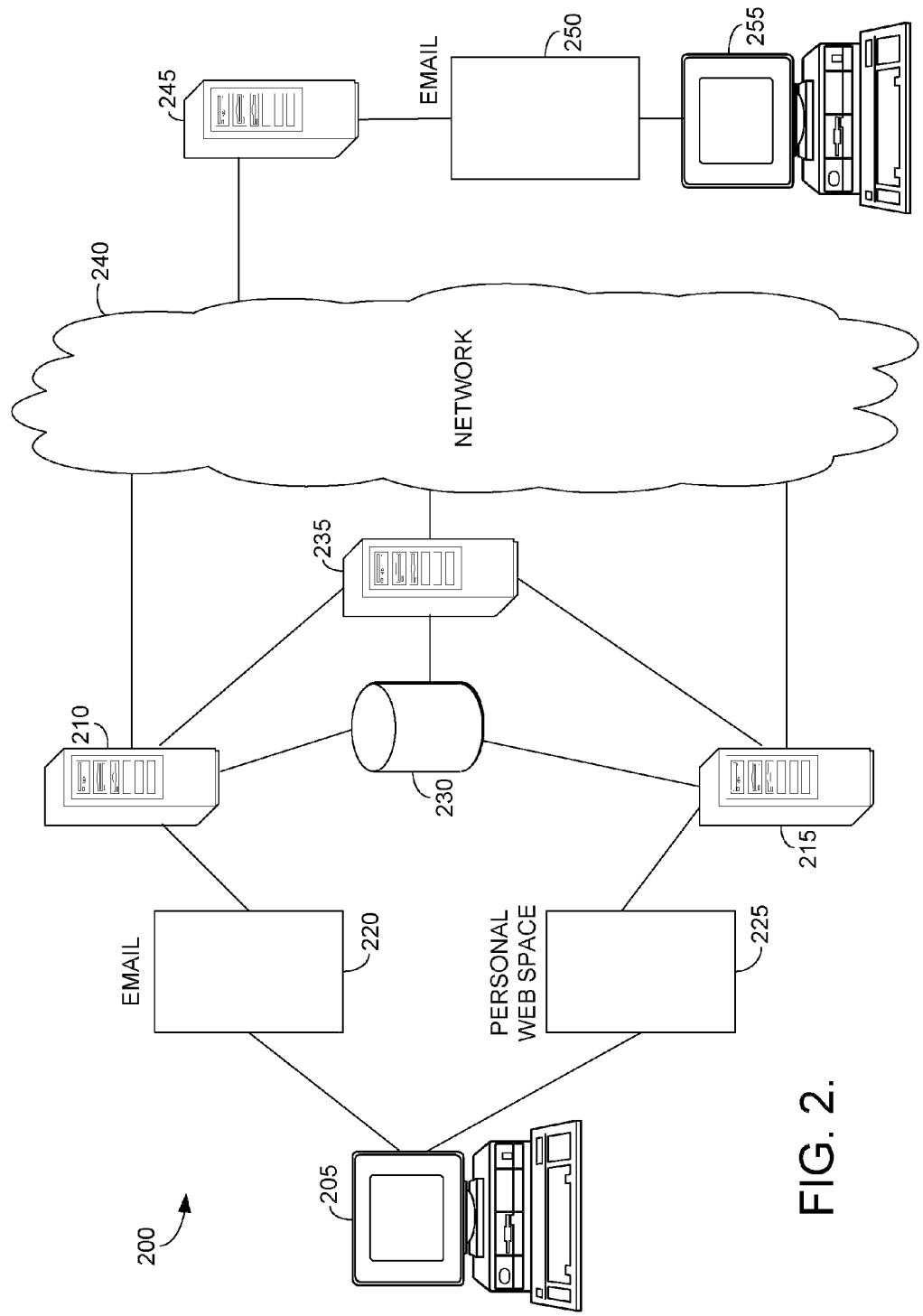
FIG. 2 is a block diagram of an exemplary brand advertising environment using logocons when practicing an embodiment of the present invention.

In FIG. 2, an exemplary brand advertising environment 200 using logocons is shown with a computing device 205 logically connected to servers 210 and 215. Server 210 contains an email 220 created by a user at computing device 205 while server 215 provides a blog 225 that was created by the user at computing device 205. Servers 210 and 215 may be connected to a storage device 230 or another server 235. Servers 210 and 215 may communicate across the Internet 240. The Internet 240 shows a logical connection to a server 245 which sends an email 250 to a computing device 255 containing another user.

FIG. 2 illustrates various ways to perform brand advertising using logocons. For example, without logocons, server 210 contains email 220 for the user at computing device 205. With logocons, computer software in server 210 connected to storage device 230 scans the email generated by the user at computing device 205 and replaces pre-determined text in the email with a logocon. Storage device 230 provides a table of information that associates a set of text with a set of logocons. The embedding of the logocon may occur while the user is typing the email or may occur when the user sends the email to a recipient.

Another embodiment of the present invention includes server 210 connected to server 235. Server 210 may be an email server while server 235 may provide a parsing or searching activity that scans the email generated by the user to replace the pre-determined text with the logocon. Storage device 230 connects to server 235 in this embodiment. Server 210 may send the email to server 235 to perform the parsing or searching activity and then return the results to server 210. Server 235 may use the table of information in storage device 230 where texts are associated with logocons. When the updated email is received from server 235, server 210 either updates the email as the user is typing or saves an updated copy of the email at computing device 205 when the user sends the email. As a result, server 210 sends the email 220 to the recipient with the logocons embedded therein.

As shown in FIG. 2, email 220 may traverse a network, like the Internet 240, to a destination server 245. From server 245, the email is sent, now known as email 250, to the recipient at computing device 255. Email 220 and email 250 may be the same. However, the recipient at computing device 255 may not want to receive emails with embedded logocons. As such, the recipient at computing device 255 may activate computer software that allows the logocons to be removed from the email or allows the original text to be placed back in the email. The recipient may activate this computer software as part of the email itself, an email service, or a third party computer software that may manipulate logocons. In either case, if the recipient turns off the feature or option to receive logocons, email 220 will be different from email 250.

Continuing with FIG. 2, the user at computing device 205 may have a personal web space that contains blog 225. The personal web space could reside on server 215. Similar to email 220, as the user types information into blog 225, logocons may appear in text. The logocons may appear in real-time while the user is typing or may appear when blog 225 is saved. Server 215 may function to provide a personal web space like MYSPACE from Myspace Incorporated of Santa Monica, Calif. Personal web spaces allows the user to keep a web log or online diary of information. The information may be saved to server 215 or it may be saved to computing device 205 with intermittent communications with server 215.

When the user types information in blog 225, server 215 may include computer software that parses blog 225 to locate specific text. Given the connection to storage device 230, server 215 may replace the specific text with a logocon based on the table that is located in storage device 230. As discussed above, server 215 may pass information in blog 225 to server 235 in order to have the parsing or searching function performed at server 235. Again, storage device 230 may provide a database function to hold a table of information or other information related to the logocons.

As shown in FIG. 2, various components may be used when implementing different embodiments of the present invention. Depending on the goal of the implementer, the components in FIG. 2 may be arranged differently. However, the current illustration shows the possibilities for handling both emails and blogs.

Figure 3A:
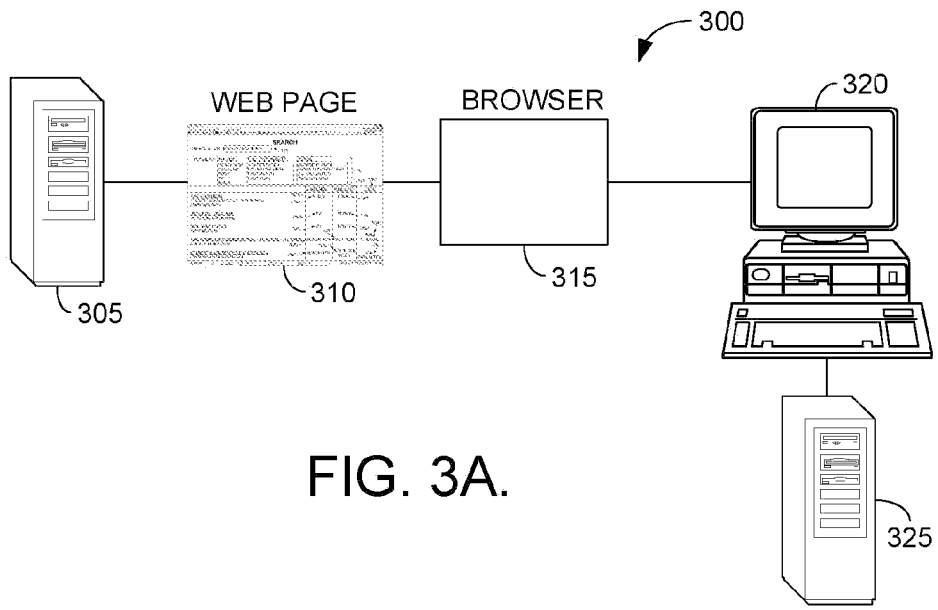
FIGS. 3A and 3B are block diagrams of exemplary Internet advertising environments using logocons when practicing an embodiment of the present invention.
Figure 3B:
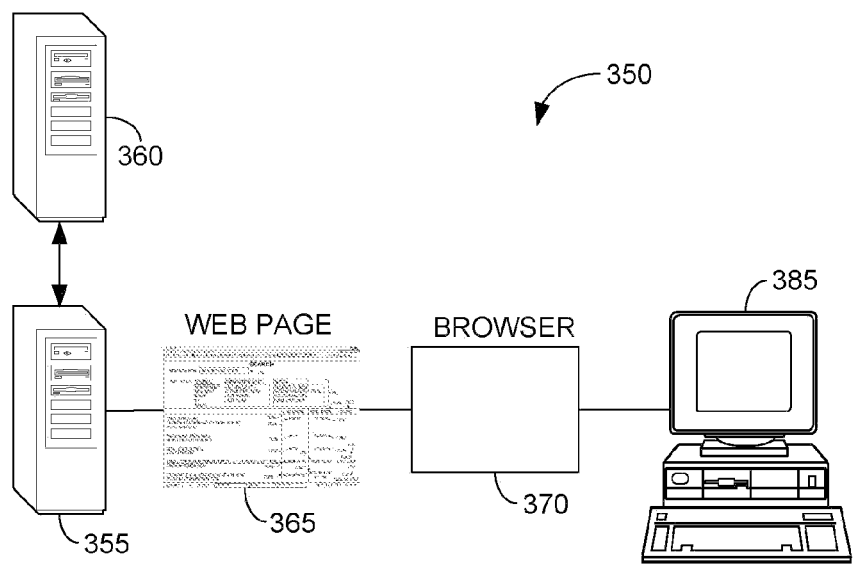

Now turning to FIGS. 3A and 3B, exemplary Internet advertising environments 300 and 350 using logocons are shown. Environment 300 shows a server 305 with a web page 310. Web page 310 is accessed by a browser 315 located in a computing device 320. Computing device 320 is connected to a computing device 325. Computing device 325 may manipulate computer software in computing device 320 or may manipulate features of browser 315.

Environment 350 shows a server 355 connected to another server 360. Server 355 provides a web page 365 which may be accessed by browser 370. Browser 370 is located at a computing device 385.

Environments 300 and 350 are very similar. Both environments provide Internet advertising using logocons. In environment 300, web page 310 is manipulated by computing device 325 when browser 315 accesses web page 310. In one embodiment, computer software in computing device 320 or computing device 325 may parse or search for text in web page 310 to replace the text with a logocon. This action occurs while the web page is loading in browser 315 or it may occur through an update of web page 310 once it is loaded with browser 315 at computing device 320. There are various ways to manipulate web page 310 in order to replace targeted text with logocons. Some of the ways include real-time changes to the web page while others may wait until the web page is completely loaded before the parsing or searching actions occurs. Environment 300 illustrates that the parsing or searching action occurs when the web page is beginning to load with browser 315 or when the web page is completely loaded at browser 315.

In environment 350, server 355 operates with server 360 to change text into logocons or add logocons to the text. Once the change occurs, the web page appears at computing device 385 with the logocons.

It is important to note with FIGS. 2-3, an implementer can implement the various embodiments of the present invention with different output results. For example, in some embodiments, text is searched in a set of information, removed from the set of information, and replaced with a logocon. In other embodiments, text may be searched in the set of information followed by the logocon being placed in proximity to the text. From this discussion, the implementer has different ways to display the logocons. The various embodiments along with the various ways to display the logocons provides flexibility to the implementer.

With environments 300 and 350, computing device 325 and server 360 contain parsing engines whereby information from web pages 310 and 365 may be passed to computing device 325 and server 360 in order to make the changes to the text. However, computing device 325 and server 360 include other software that directly manipulates web pages 310 and 365 in order to accomplish the same task of changing text into logocons or adding logocons with identified text. The idea here is to illustrate that logocons may be provided in a real-time action involving web page 310 or may be provided in a delayed action similar to a manual update of the web page.

Figure 4:
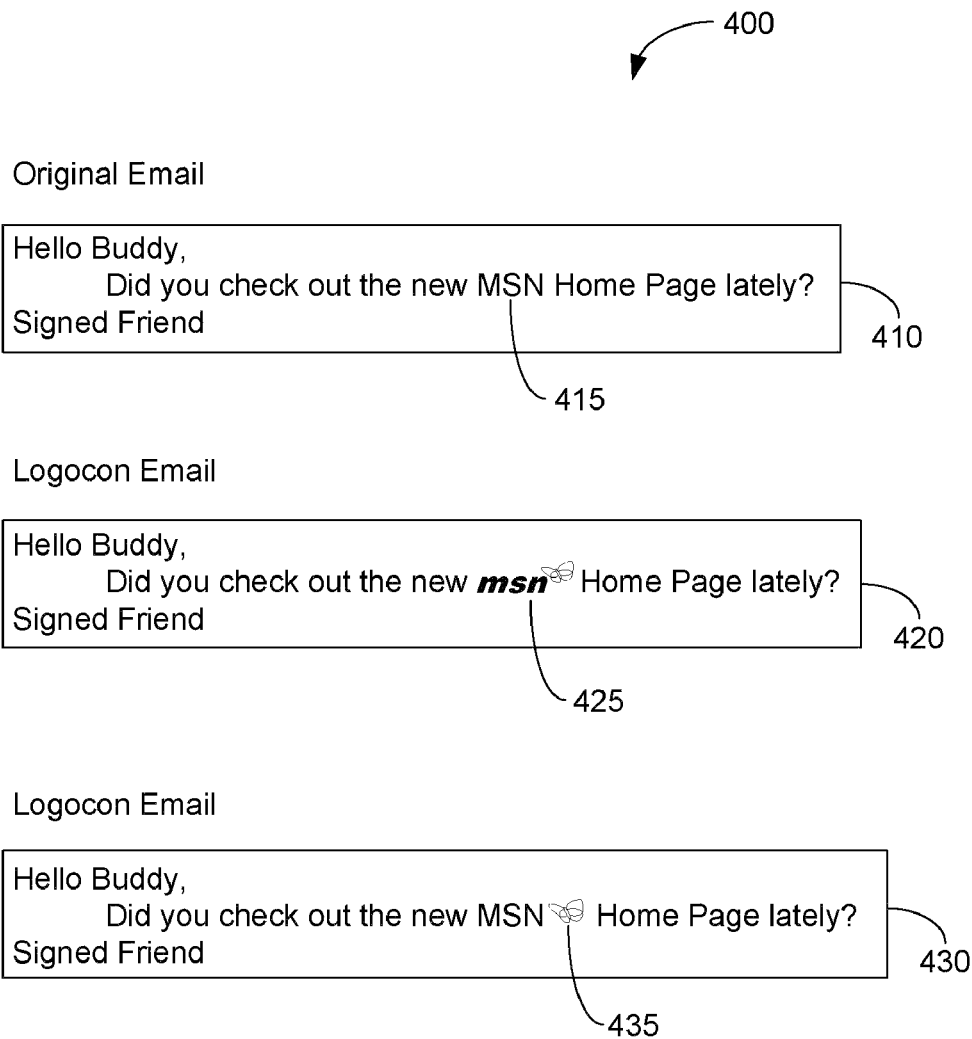
FIG. 4 is a block diagram of exemplary email messages provided when implementing an embodiment of the present invention.

In FIG. 4, exemplary email messages 400 are shown with messages 410, 420, and 430. Exemplary email messages 400 illustrates the outputs of the actions discussed in FIGS. 2-3. Message 410 illustrates an ordinary email message sent from Friend to Buddy. Without implementing an embodiment of the present invention or implementing the embodiment with the logocon feature turned off, an ordinary email message is delivered to the recipient with no change to the email. However, upon implementing an embodiment of the present invention, message 420 illustrates that the text MSN changes to logocon 425. The text MSN is completely replaced by logocon 425. In another embodiment of the present invention, message 430 illustrates that the text MSN changes to text MSN plus icon 435. Rather than replacing the text, icon 435 is added in proximity to the text MSN. In this case, icon 435 follows the text MSN.

As shown in FIG. 4, an advertiser may correlate various text to various logocons. In some cases, the same text may correlate to several logocons. Additional computer software may be used to coordinate text with several logocons. Logocons may be selected depending on such things as the type of computing activity, the time of day, or the location of the text to name a few. For example, as seen with logocons 425 and 435, the text MSN correlates to both logocons but were used in different embodiments of the present invention. However, logocons 425 and 435 could be stored in storage device 230 in the table entry. The computer software could select logocon 425 for all first encounters of the text MSN and could select logocon 435 for all subsequent encounters of the text MSN. It is up to the advertiser to determine the implementation strategy for the logocons.

Figure 5:
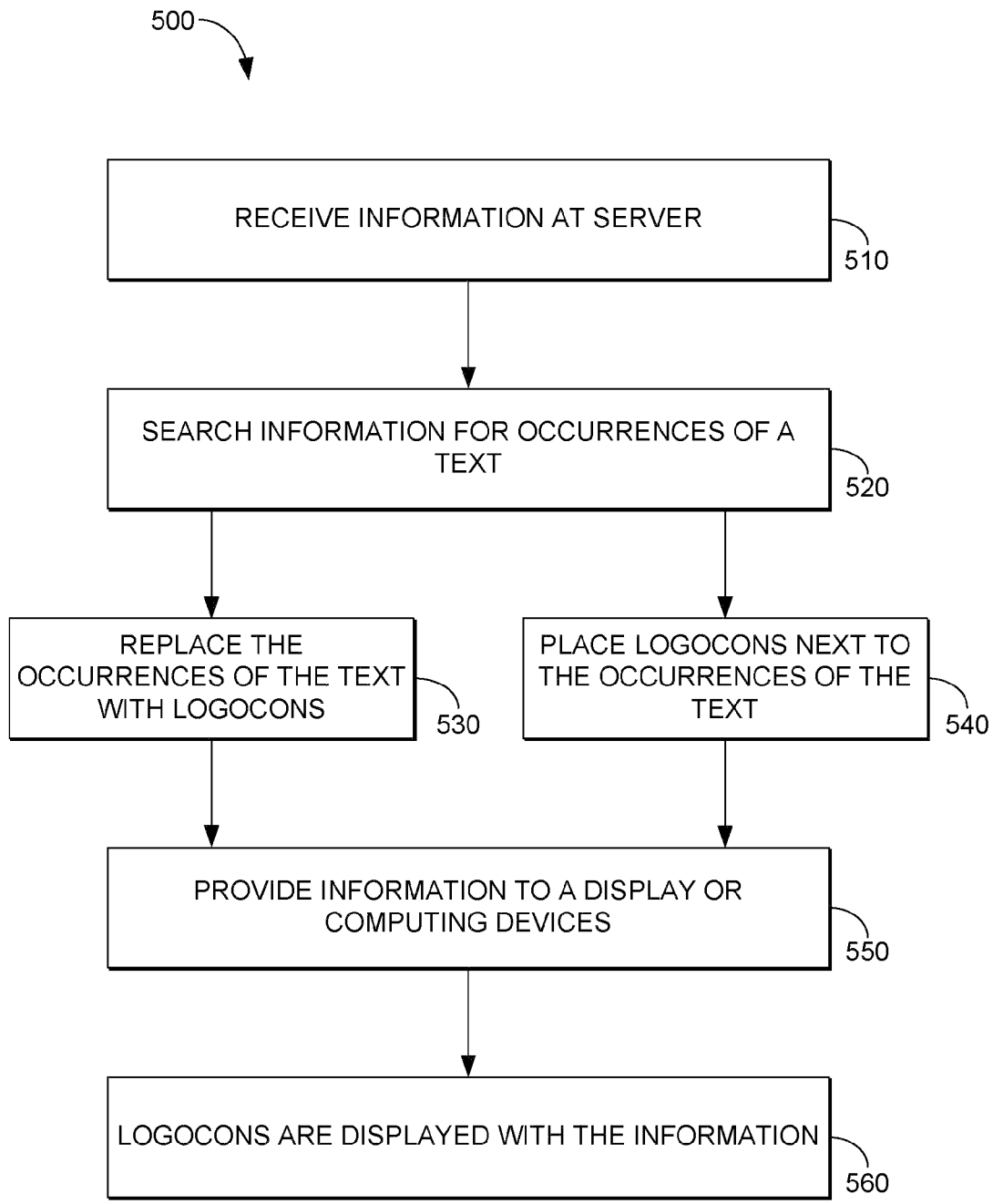
FIG. 5 is a flowchart of an exemplary process for providing a logocon in a computing environment when implementing an embodiment of the present invention.

In FIG. 5, a process for providing a logocon in a computing environment is provided in a method 500. In a step 510, information is received at a server. The information could be an email such as email 220, a blog such as blog 225, or web pages 310 and 365. The server could be server 210, server 215, computing device 325, or server 360. In a step 520, the information is searched or parsed for the occurrences of a text. This searching or parsing activity occurs at the server. In a step 530, for each located text, a logocon is placed in the position of the located text. In a step 540, for each located text, the logocon is placed next to the text. Once the logocon is embedded in the information, the information may be provided to a display device for viewing or may be provided to another computing device. For example, with a web page, a user may view the information with the logocon on the screen of the computing device. With an email, the user may send the information with the logocon to a recipient at another computing device. The logocon may be viewed by the user or may be viewed by the recipient which is step 560.

Figure 6:
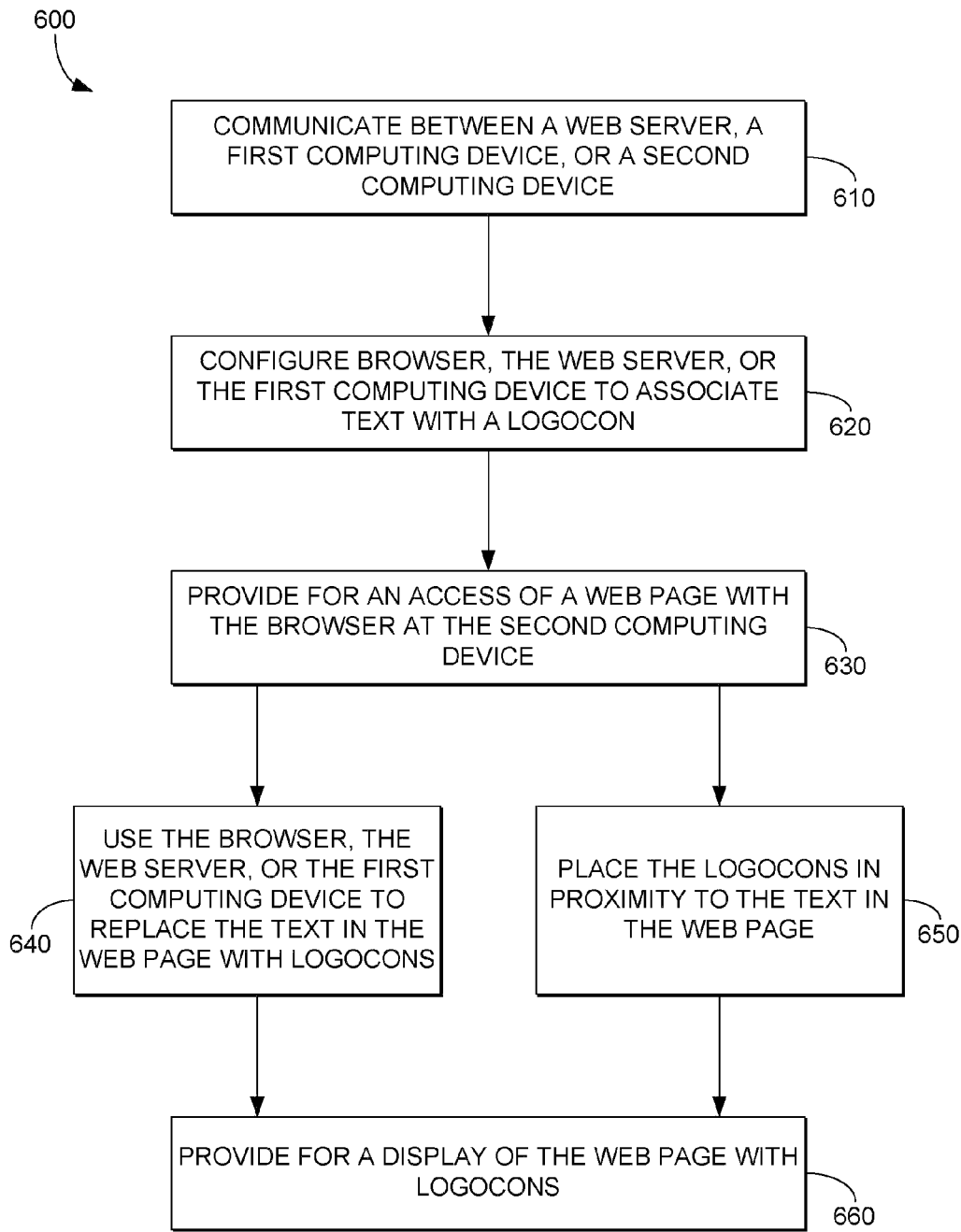
FIG. 6 is a flowchart of an exemplary process for displaying a logocon in a web page when implementing an embodiment of the present invention.

Turning now to FIG. 6, a process for displaying a logocon in a web page is shown in a method 600. In a step 610, communications occur between web server 305 or 355, a first computing device (computing device 325 or server 360), or a second computing device (computing device 320 or 385). It is not mandatory that communications occur between all three devices. In a step 620, web browser 315 or 370, web server 305 or 355, or the first computing device (325 or 360) may be configured to associate texts with logocons. For example, brand names of products or services may be associated with brand logos. Although not discussed in the method, a database may be connected to one or more of the devices in order to store a table of data containing the association of texts to logocons. In a step 630, a mechanism to access web page 310 or 365 with web browser 315 or 370 is provided at the second computing device (320 or 385). In a step 640, either web browser 315 or 370, web server 305 or 355, or the first computing device (325 or 360) may be used to replace the text in web page 310 or 365 with logocons. In a step 650, rather than replacing the text with logocons, the logocons are placed near the text in web page 310 or 365. In a step 660, a display of web page 310 or 365 with logocons is provided.

Remembering that logocons may be used to replace consumer-generated content that contains a product's or service's brand name, a scenario using HOTMAIL from the Microsoft Corporation of Redmond, Wash. and PEPSI from PepsiCo Incorporated of Purchase, N.Y. is provided in illustrating the point further. In HOTMAIL, a user types an email to a friend containing the following text, "Barbeque at my place Saturday for lunch. Can you bring some Pepsi?" The word "Pepsi" would get replaced or followed subsequently with Pepsi's logo, but as a logocon that has a size relative to the size of the surrounding text.

In addition to the discussions above, some general information about logocos may be found. Logocons may be embedded into information, files, documents, or writings as links or clickable items. A click on the logocon may send the user to the advertiser's web site or another web page as an example. The user could also turn off a feature or option that allows logocons to be embedded in the user's generated content. A recipient of an email may also have the turn on and turn off feature or option as well to stop changes from occurring to received email. In some cases, an implementer of an embodiment of the present invention may restrict the automatic appearance of logocons in information but provide, for example, a small icon or action indicator that appears above or below the text in the information. The user may click on the indicator to display the logocon as a hovering image providing to the user the option of either selecting the logocon with a click or removing the logocon, keeping the original text.

An implementer of an embodiment of the present invention may use various computer software to include other considerations for the implementation. For example, the implementer may restrict the number of logocons that could appear in consumer-generated text. The implementer may incorporate policy statements or other procedures that could restrict the use of logocons if the entire information or context is unfavorable to the brand name or owner. For example, if the brand name was used in a derogatory manner, computer software could be implemented with the searching or parsing process to prohibit the use of the logocon. In yet another consideration, the implementer may include computer software that intelligently identifies the proper context for words that are spelled the same as a brand name but containing different meanings. The computer software would have to identify when to provide a logocon for the brand name.

Logocons are a creative way for brand advertisers to achieve greater brand recognition online. Publishers can make use of web sites containing consumer-generated content which were previously undesirable or inaccessible. Publishers can incorporate various pricing models such as incorporating a pricing model on a "pay per occurrence" basis where the advertisers pay each time a logocon is shown.

The prior discussion is for illustrative purposes to convey exemplary embodiments. The steps discussed in FIGS. 5 and 6 may be executed without regards to order. Some steps may be omitted and some steps may be executed at a different time than shown. For example, step 540 may be executed before step 530, and step 650 may be executed before step 640. The point here is to convey that the figures are merely exemplary for the embodiments of the present invention and that other embodiments may be implemented. It will be understood that certain features and sub-combinations are of utility and may be employed without reference to other features and sub-combinations and are contemplated within the scope of the claims.

As shown in the above scenarios, the present invention may be implemented in various ways. From the foregoing, it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. One or more computer-readable storage media containing thereon computer-readable code that is executed to perform a method for providing a logocon in a computing environment, the method comprising:
   receiving a set of information at a computing device, wherein the set of information is selected from a group including an email, a web page, a file, a document, and an online writing, and wherein the computing device is a server;
   locating one or more occurrences of a text in the set of information;
   at least one of replacing the one or more occurrences of the text respectively with one or more logocons or placing the one or more logocons in proximity to the one or more occurrences of the text, wherein the logocon is a logo icon that replaces or follows text and the logo icon has a relationship to the text, and wherein proximity is defined as being within three words of the occurring text;
   providing the set of information to 1) a display, or 2) one or more client computing devices, with the one or more logocons embedded in the set of information, wherein the one or more logocons are displayed with the set of information; and
   resizing the one or more logocons to coincide with the set of information.

2. The media of claim 1, further comprising associating the text with the logocon in a table of information in a storage device, wherein the storage device communicates with the computing device or the storage device communicates with another computing device that communicates with the computing device, and wherein the another computing device is another server.

3. The media of claim 2, wherein the computing device includes a parsing engine to locate the one or more occurrences of the text.

4. The media of claim 2, wherein receiving the set of information at the computing device comprises at least one of:
   receiving a blog at a server wherein the set of information is the blog and the computing device is the server wherein the blog is received when a user types an entry or saves the entry;
   receiving the email at an email server wherein the set of information is the email and the computing device is the email server; and
   receiving an instant message at a message server wherein the set of information is the instant message and the computing device is the message server.

5. The media of claim 4, wherein providing the email comprises at least one of providing a preview email to a sender of the email or providing the email to a recipient.

6. The media of claim 5, further comprising receiving an indication from the recipient of the email to not allow a display of the one or more logocons.

7. A computer system having a processor and a memory, the computer system operable to execute a method for providing a logocon in a computing environment, the method comprising:
   receiving a set of information at a computing device, wherein the set of information is selected from a group including an email, a web page, a file, a document, and an online writing, and wherein the computing device is a server;
   locating one or more occurrences of a text in the set of information;
   at least one of replacing the one or more occurrences of the text respectively with one or more logocons or placing the one or more logocons in proximity to the one or more occurrences of the text, wherein the logocon is a logo icon that replaces or follows text and the logo icon has a relationship to the text, and wherein proximity is defined as being within three words of the occurring text;
   providing the set of information to 1) a display, or 2) one or more client computing devices, with the one or more logocons embedded in the set of information wherein the one or more logocons are displayed with the set of information; and
   resizing the one or more logocons to coincide with the set of information.

8. The system of claim 7, wherein receiving the set of information at the computing device comprises at least one of:
   receiving a blog at a server wherein the set of information is the blog and the computing device is the server wherein the blog is received when a user types an entry or saves the entry;
   receiving the email at an email server wherein the set of information is the email and the computing device is the email server; and
   receiving an instant message at a message server wherein the set of information is the instant message and the computing device is the message server.

9. The system of claim 8, wherein providing the email comprises at least one of providing a preview email to a sender of the email or providing the email to a recipient.

10. The system of claim 7, further comprising receiving an action at the display or the one or more computing devices from a mouse pointer or a user selection selecting the logocon in the set of information wherein a new web page is displayed.

11. A computer system having a processor and a memory, the computer system operable to execute a method for displaying a logocon in a web page, comprising:
   communicating with a web server;
   configuring the web server to associate a text with a logocon, wherein the logocon is a logo icon that replaces or follows text, and the logo icon has a relationship to the text;
   providing for an access of the web page with a browser at a client computing device;
   displaying the web page with a set of logocons, wherein the web server replaces one or more occurrences of the text in the web page with one or more logocons, or places the one or more logocons in proximity to the one or more occurrences of the text in the web page, wherein proximity is defined as being within three words of the occurring text;
   communicating with the client computing device; and
   resizing the one or more logocons to coincide with one or more text in the web page.

12. The system of claim 11, further comprising providing an option with the web page to allow or not allow the display of the one or more logocons in the web page.

* * * * *